April 22, 1969   W. BAUMGAERTNER ET AL   3,439,647
INDICATING APPARATUS
Filed Aug. 25, 1966
FIG.1
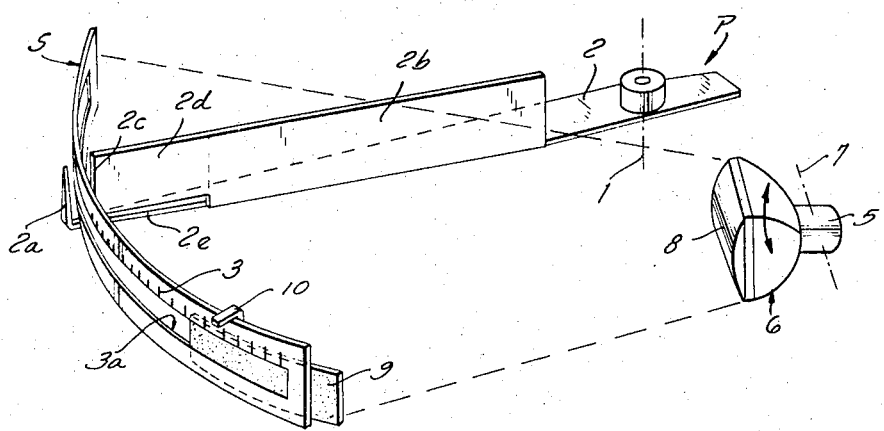
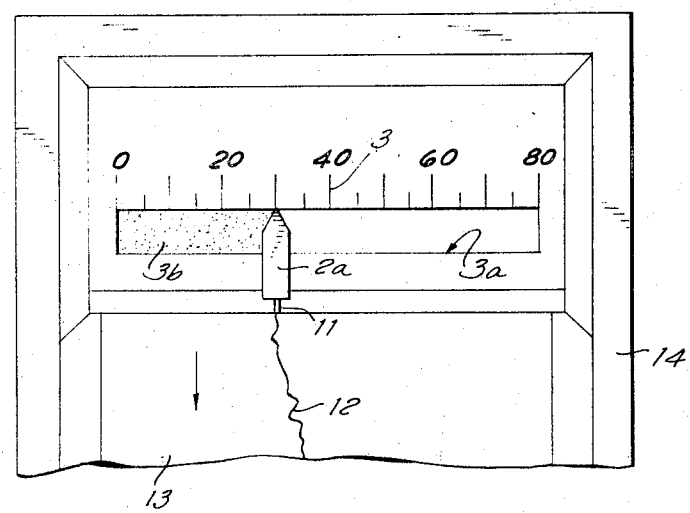
FIG.2
INVENTORS
WILHELM BAUMGARTNER
LUDWIG ZWICKER
MANFRED SZYSZKA
BY
Michael J. Striker
their ATTORNEY

United States Patent Office 3,439,647
Patented Apr. 22, 1969

3,439,647
INDICATING APPARATUS
Wilhelm Baumgaertner, Trier, and Ludwig Zwicker and Manfred Szyszka, Nuremberg, Germany, assignors to Metrawatt Aktiengesellschaft, Nuremberg, Germany
Filed Aug. 25, 1966, Ser. No. 574,985
Claims priority, application Germany, Aug. 27, 1965, M 52,649
Int. Cl. G09f *13/04, 9/00*
U.S. Cl. 116—129  12 Claims

ABSTRACT OF THE DISCLOSURE

An indicating apparatus wherein the scale is provided with an elongated light-penetrable portion and the tip of the pointer extends in front of the scale. The arm of the pointer is located behind the scale and the scale is movable with reference to the pointer or vice versa to place the tip into registry with different regions of the light-penetrable portion. The apparatus comprises illuminating means located behind the scale at one side of the arm and masking means carried by the arm to cast a shadow upon the light penetrable portion of the scale at the other side of the arm.

---

The present invention relates to indicating apparatus for measuring, recording and like instruments. More particularly, the invention relates to improvements in so-called shadow indicators wherein a pointer moves with reference to a graduated scale or vice versa.

In many presently known measuring and like instruments, accurate reading of the scale (i.e., accurate determination of the position of the pointer tip with reference to the scale) is possible only if the observer stands or sits in front of the scale. In order to facilitate reading or rough estimation of the indicated value from a greater distance, certain measuring instruments employ on their control panels so-called shadow indicators or illuminated band scales. A serious drawback of presently known shadow indicators is that the exact value cannot be read with requisite accuracy, even if the observer positions himself at a relatively short distance from the scale, because the transition from the illuminated to the shaded section of the scale is not sharp. Heretofore known attempts to improve such conventional shadow indicators involve the use of complicated and expensive optical systems whose utilization is justifiable in connection with highly expensive measuring instruments but is unwarranted in a relatively simple instrument or where a large number of simple instruments should furnish readings at shorter and/or longer distances.

Accordingly, it is an important object of the present invention to provide a very simple, inexpensive and readily adjustable indicating apparatus wherein the position of the pointer tip with reference to the scale may be easily determined from a shorter or greater distance and wherein such improvement can be achieved with small expenditures in material and at a low cost.

Another object of the invention is to provide an improved shadow indicator wherein the line separating the shaded and illuminated sections of the scale does not affect the reading of values indicated by the pointer tip and wherein an estimation as to the exact position of the pointer with reference to the scale can be facilitated not only by contrast between the illuminated and shaded sections of the scale but also by a resorting to very simple, readily adjustable and readily discernible reference markers or analogous auxiliaries.

A further object of the invention is to provide a shadow indicator of the type wherein the pointer turns about a fixed axis and its tip travels along the front surface of an arcuate scale, and to construct and assemble the indicator in such a way that the intensity of illumination may be regulated in a very simple and convenient manner.

A concomitant object of the invention is to provide a shadow indicator which is particularly suited for use in connection with single- or multiple-pen recorders.

Still another object of the invention is to provide a shadow indicator which comprises a minimal number of simple parts, which occupies very little room, and which can be produced by simple and inexpensive conversion of presently known indicators.

Briefly stated, one feature of our invention resides in the provision of an indicating apparatus which comprises a scale member having front and rear surfaces and an elongated light-penetrable portion, a pointer member having an arm and a tip respectively located at the rear and front surfaces of the scale member, means for moving one of these members with reference to the other member (for example, for turning the pointer member about a fixed axis whereby the tip of the pointer member moves into registry with different regions of the light-penetrable portion at the front surface of the scale member), illuminating means positioned to illuminate the rear surface of the scale member from one side of the arm, and masking means preferably resembling a vane or blade which is carried by the arm of the pointer member to cast a shadow upon the light-penetrable portion at the other side of the arm.

The masking member may but need not consist of opaque material and a portion thereof preferably extends into immediate proximity of the rear surface of the scale member so that the line separating the illuminated and shaded sections of the scale member is overlapped by the tip which latter is preferably wide enough to extend at least slightly to both sides of such dividing line.

The light-penetable portion may be constituted by a slotted portion of the scale member and the slot of such portion may receive a pane or foil of light-diffusing material. A portion of such slot at the one side of the arm may be screened by one or more preferably adjustable reference markers of opaque or translucent material to further facilitate determination of the position of the pointer tip.

The novel features which are considered as characteristic of the invention are set forth in particular in the appended claims. The improved indicating apparatus itself, however, both as to its construction and its mode of operation, together with additional features and advantages thereof, will be best understood upon perusal of the following detailed description of a specific embodiment with reference to the accompanying drawings, in which:

FIG. 1 is a diagrammatic perspective view of the essential parts of an indicating apparatus which embodies our invention; and FIG. 2 is a front elevational view of a band recorder which is combined with the indicating apparatus of FIG. 1.

Referring first to FIG. 1, there is shown a shadow indicator which comprises a pointer P and a so-called profile scale S. The arm 2 of the pointer P is turnable about a fixed axis indicated by the dot-dash line 1 whereby the upwardly bent tip 2a of the pointer travels along the front surface of the scale S and can move into registry with one of the graduations 3. The pointer P may be turned by a setting motor or by a measuring mechanism which applies thereto torque in a manner not forming part of the present invention. The scale S resembles a portion of a ring whose center is located on the axis 1, and this scale comprises an elongated central portion which can be penetrated by light due to the provision therein of a slot 3a of constant width which extends directly below the graduations 3 and behind the tip 2a of the pointer P.

In accordance with an important feature of our invention, the arm 2 of the pointer P carries at the rear surface of the scale S an elongated vane- or blade-like masking member 2b having a front end portion or flap 2d whose front edge 2c extends into immediate proximity of the rear surface of the scale S and is overlapped by the tip 2a. The flap 2d is separated from the arm 2 by a narrow incision or slit 2e so that it may be flexed back and forth in the direction of movement of the tip 2a along the scale 3. The pointer P may be made integral with the masking member 2b and may consist of ductile sheet metal which is shaped in a suitable stamping machine. An illuminating device 6 is positioned at one side of the arm 2 to direct light against the rear surface of the scale S whereby the masking member 2b casts a shadow 3b (see FIG. 2) upon the slot 3a at the other side of the arm 2. The flap 2d will provide a sharply defined dividing line which separates the illuminated portion of the slot 3a from the shaded portion, and FIG. 2 shows that the tip 2a is relatively wide so that it extends to both sides of the dividing line between the shaded and illuminated sections of the slot 3a. The masking member 2b extends substantially radially of the scale S and its height is sufficient to cast a shadow over the entire rear surface of the scale at the other side of the arm 2.

The illuminating device 6 comprises an exchangeable light bulb 5 or an analogous light source and a cylindrical lens 8 which can direct light against the entire rear surface of the scale S when the pointer P has been turned to its leftmost position as viewed in FIG. 2. The lens 8 or the entire illuminating device 6 is adjustable in one or more directions. In the illustrated embodiment the illuminating device 6 is rockable about an axis 7 which is normal to the axis 1 to facilitate an optimum orientation of light with reference to the scale S.

The flap 2d of the masking member 2b will be flexed during assembly so as to be located in the central symmetry plane of the tip 2a.

If the shadow indicator of FIG. 1 is not installed behind a window pane, the slot 3a in the scale S preferably receives a pane, foil or strip of frosted glass or transparent or translucent plastic. Such strip or foil can be coated with phosphorescent paint so that, due to excitation by light rays emanating from the light bulb 5, a very contrasting indication is obtained even if the indicator is used in a darkened room.

A reference marker 9 may be used to point out important graduations or ranges on the scale S. This marker 9 may be constituted by a color filter or color foil of translucent colored material and is provided with a lobe 10 serving as an adjusting means to facilitate its displacement lengthwise of the slot 3a. The ways for the marker 9 are not shown in the drawings. If the indicator is installed in a housing, the operator will open the housing and will adjust the marker 9 with the help of the lobe 10 so that the marker will overlie a selected portion of the slot 3a. Of course, the scale S may carry two or more differently colored markers each of which can be as long as or considerably shorter than the marker 9 of FIG. 1.

As stated before, the pointer P may be made integral with the masking member 2b and can consist of ductile sheet metal. However, it is equally within the purview of our invention to make the masking member 2b of thin, colored, translucent or opaque plastic material and to secure it to the arm 2 by resorting to adhesive or the like.

Parallax errors due to lateral mounting of the illuminating device 6 are eliminated by utilizing a tip 2a which is wide and high enough to conceal the dividing line which separates the illuminated and shaded portions of the rear surface on the scale S. Thus, even if the position of the pointer tip 2a is observed at an acute angle with reference to the front surface of the scale S, the dividing line between the shaded and illuminated portions is always concealed by the tip 2a.

FIG. 2 illustrates the housing 14 of a band recorder which accommodates the shadow indicator of FIG. 1. The arm 2 or tip 2a of the pointer P is connected with a recording pen 11 which plots a curve 12 on a travelling record carrier band 13. The reference marker 9 has been removed. The measured value is indicated on the scale S by the upper end portion of the tip 2a which travels along the graduations 3 and entrains the pen 11. The slot 3a is covered with a light-diffusing translucent plastic strip and appears dark at 3b, i.e., at the shade side of the masking member which is not shown in FIG. 2. The right-hand part of the slot 3a is bright. An experienced observer will readily determine the approximate position of the tip 2a by comparing the lengths of the illuminated and shaded portions of the slot 3a, even if the reading is taken at a considerable distance from the housing 14.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an indicating apparatus, a scale member having a front and a rear surface and an elongated light-penetrable portion having a pair of elongated edges; a pointer member having an elongated arm located rearwardly of said rear surface of said scale member and a tip connected to one end of said arm and being located closely adjacent to said front surface of said scale member and extending at least from one to the other of said elongated edges of said light-penetrable portion thereof so as to divide that elongated light-penetrable portion into two sections located at opposite sides of said tip, one of said members being movable with respect to the other member in directions to place said tip into registry with different regions of said light-penetrable portion; illuminating means positioned to illuminate said rear surface from a point located at one side of said arm; and masking means carried by said arm to cast a shadow upon said light-penetrable portion at the other side of said arm.

2. A structure as set forth in claim 1, wherein said light-penetrable portion is constituted by a slotted portion of said scale and wherein said tip overlies said slotted portion at the front surface of said scale member.

3. A structure as set forth in claim 1, wherein said masking means extends into immediate proximity of said rear surface behind said tip so that the dividing line between the illuminated and shaded parts of said rear surface is overlapped by said tip.

4. A structure as set forth in claim 1, wherein said light-penetrable portion of the scale member is provided with an elongated slot and wherein said scale member further comprises a body of light-diffusing material installed in said slot.

5. A structure as set forth in claim 1, wherein said masking means comprises an end portion extending into immediate proximity of said rear surface and being adjustable with reference to said arm in the direction of relative movement between said members.

6. A structure as set forth in claim 1, wherein said illuminating means comprises a source of light and means for focussing such light upon the rear surface of said scale member.

7. A structure as set forth in claim 6, wherein said focussing means comprises a cylindrical lens, said lens being adjustable with reference to said members.

8. A structure as set forth in claim 1, wherein said pointer member is turnable about a first axis and said lens is turnable about a second axis which is substantially normal to said first axis.

9. A structure as set forth in claim 1, further comprising reference marker means movable relative to said scale member to overlie selected regions of said light-penetrable portion at said one side of the arm.

10. A structure as set forth in claim 9, wherein said marker means consists of translucent material.

11. A structure as set forth in claim 1, wherein said masking means consists at least in part of translucent colored material.

12. A structure as set forth in claim 1, further comprising means for recording the movement of said one member with reference to said other member.

References Cited

UNITED STATES PATENTS

| | | | |
|---|---|---|---|
| 1,740,130 | 12/1929 | Von Voss et al. | 116—114.12 |
| 2,107,936 | 2/1938 | Gardner | 116—114.13 |
| 2,138,875 | 12/1938 | Miessner | 116—114.13 |
| 2,476,315 | 7/1949 | Morrison | 116—129 XR |
| 2,598,552 | 5/1952 | Jansen | 116—129 XR |
| 2,759,447 | 8/1956 | Helgeby | 116—57 |
| 2,945,120 | 7/1960 | Green et al. | 116—129 XR |
| 2,984,204 | 5/1961 | White | 116—116 XR |
| 3,123,042 | 3/1964 | Merlin | 116—129 |
| 3,266,457 | 8/1966 | Morgan | 116—129 |
| 3,298,351 | 1/1967 | Koza | 116—129 |
| 2,850,942 | 9/1958 | Stevenson et al. | 116—114 XR |

FOREIGN PATENTS

| | | |
|---|---|---|
| 628,719 | 9/1949 | Great Britain. |
| 1,241,588 | 8/1960 | France. |
| 496,350 | 4/1930 | Germany. |
| 579,670 | 7/1933 | Germany. |

LOUIS J. CAPOZI, *Primary Examiner.*

U.S. Cl. X.R.

73—431